US008582422B2

(12) United States Patent
Mongeau et al.

(10) Patent No.: US 8,582,422 B2
(45) Date of Patent: Nov. 12, 2013

(54) ACCESS POINT CONFIGURATION PROPAGATION

(75) Inventors: Yves Mongeau, Laval (CA);
Marc-Olivier Mercier, St-Laurent (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 13/080,404

(22) Filed: Apr. 5, 2011

(65) Prior Publication Data

US 2012/0257491 A1 Oct. 11, 2012

(51) Int. Cl.
*H04L 12/26* (2006.01)
*H04L 12/28* (2006.01)
*H04W 4/00* (2009.01)
*H04B 1/38* (2006.01)

(52) U.S. Cl.
USPC ............ 370/216; 370/254; 370/328; 455/561

(58) Field of Classification Search
USPC ................. 370/216–254, 328, 329, 330, 401; 455/561; 342/463–465
See application file for complete search history.

(56) References Cited

U.S. PATENT DOCUMENTS

| | | | |
|---|---|---|---|
| 2003/0234741 A1 | 12/2003 | Rogers et al. | |
| 2006/0159043 A1* | 7/2006 | Delp et al. | 370/328 |
| 2007/0147396 A1* | 6/2007 | Lee et al. | 370/401 |
| 2008/0019313 A1 | 1/2008 | Vogety | |
| 2009/0104954 A1* | 4/2009 | Weber et al. | 463/1 |
| 2009/0232311 A1 | 9/2009 | Meier et al. | |
| 2009/0318193 A1 | 12/2009 | Littlefield et al. | |
| 2013/0060818 A1* | 3/2013 | Lambeth et al. | 707/803 |

FOREIGN PATENT DOCUMENTS

| | | |
|---|---|---|
| CN | 101252498 A | 8/2008 |
| CN | 101594693 A | 12/2009 |

* cited by examiner

*Primary Examiner* — Afsar M Qureshi

(57) ABSTRACT

A method of access point configuration propagation includes receiving, at a controller, a connectivity request from a number of access points; with a master controller, creating a configuration for the access points; and sending configuration data based on the created configuration to a number of slave controllers. A master controller for propagating access point configurations within a wireless network system includes a processor that creates a configuration for each of a number of access points requesting connectivity within the wireless network system, and a data storage device that stores configuration data based on the created configuration in an access point configuration table.

16 Claims, 3 Drawing Sheets

ACCESS POINT CONFIGURATION PROPAGATION

BACKGROUND

A wireless computer network provides for communication between networked computing devices without a physical connection. Wireless networking is a convenient method by which computing network installations avoid the expense of introducing cables and related structure into to a worksite as a connection between various computing devices and equipment locations.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
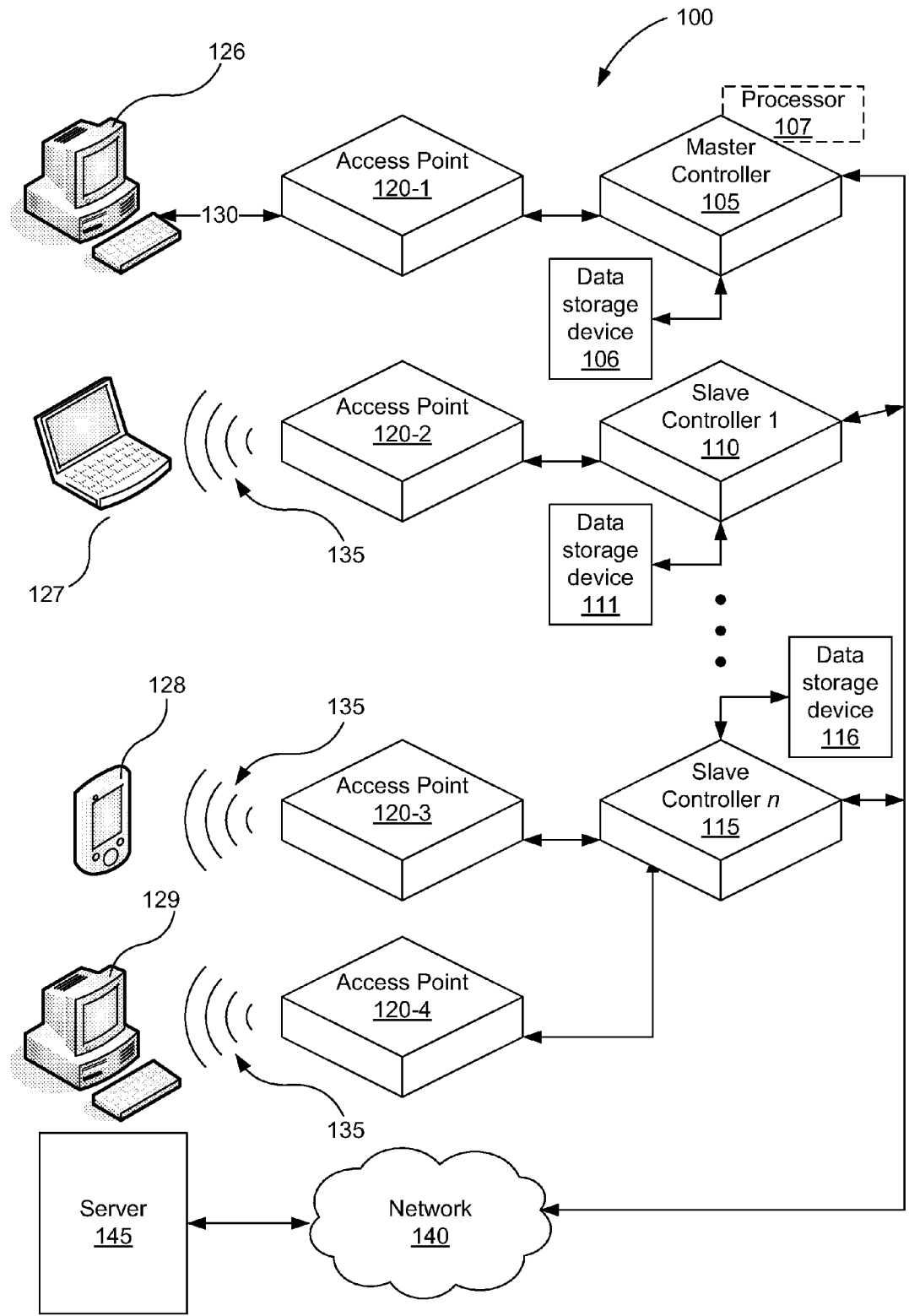
FIG. 1 is a diagram of an illustrative system for propagating access point configuration data, according to one example of the principles described herein.

A wireless network includes various network elements that are subject to failure, including, for example, a network controller. As used herein, and in the appended claims, the term "network controller," or simply "controller," refers to a device within a wireless computer network that is used to perform automatic adjustments to radio frequency (RF) power, channels, authentication, and security for the various wireless access points of the network. In a network configuration, there will be a master controller and a number of slave controllers. Each controller supports one or more access points through which computing devices can access the network. The allocation of supporting relationships between the access points and controllers is known as an access point configuration. If a controller fails, portions of the wireless network previously supported by that controller may be rendered inoperable.

The present specification discloses systems and methods of creating access point configurations and propagating those configurations throughout a team of controllers within a wireless computer network. For example, the present specification discloses that, if a failure occurs with one or more of the controllers within the team of controllers, the remaining working controllers within the team can be utilized to retain connectivity throughout the wireless computer network.

Access points within a wireless computer network that are supported by a team of controllers can potentially communicate with any of the controllers in the team. Thus, when any controller in the team fails, the remaining working controllers are tasked with providing connectivity for the access points that were previously supported by the failed controller or controllers. The access points experiencing failure of their supporting controller can attempt to resume their normal operating mode by connecting to a different controller in the team. However, a remaining controller may not be configured to provide connectivity to those access points. This is because the remaining controllers are not aware, configuration-wise, of those access points whose associated controller failed.

Additionally, if a new access point is added to the network, a new access point configuration is needed so that a controller can take responsibility for supporting that new access point.

Therefore, the present specification discloses a master controller that is assigned, among the number of controllers, to create an access point configuration for the access points within the wireless network system. The master controller then propagates that configuration data to the slave controllers. In this manner, every controller is aware of every access point within the wireless computer network, and, if a failure occurs with one or more controllers, the remaining controllers can provide connectivity to the access points previously supported by the failed controller. In this manner, the system provides for enhanced capacity and scalability within the network. Further, the system and method of the present specification provides redundancy in case of controller failure.

In the following description, for purposes of explanation, numerous specific details are set forth in order to provide a thorough understanding of the present systems and methods. However, the present apparatus, systems, and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

FIG. 1 is a diagram of an illustrative wireless communication network (100), including a master controller (105) for propagating access point configuration data, according to one example of the principles described herein. The wireless communication network (100) includes a number of controllers (105, 110, 115), a number of access points (120-1, 120-2, 120-3, 120-4) communicatively coupled to the controllers (105, 110, 115), and a number of wireless computing devices (126, 127, 128, 129) communicatively coupled to the access points (120-1, 120-2, 120-3, 120-4) of the network (100). These elements are communicatively coupled to a wired network (140) and a number of servers (145) located within that network (140). Each of these elements will now be discussed in more detail below.

Acting as intermediary devices between the computing devices (126, 127, 128, 129) and the controllers (105, 110, 115), the access points (120-1, 120-2, 120-3, 120-4) allow the computing devices (126, 127, 128, 129) to connect to the wired network (140). The access points (120-1, 120-2, 120-3, 120-4) may communicate wirelessly (135) with the computing devices (126, 127, 128, 129) using, for example, IEEE 802.11 standards (developed by Wi-Fi Alliance® (commonly referred to as Wi-Fi®)), or IEEE 802.15 standards (developed by Bluetooth Special Interest Group (commonly referred to as Bluetooth®)), among others. Additionally or alternatively, the access points (120-1, 120-2, 120-3, 120-4) may communicate (135) with supported computing devices (e.g., 126, 127, 128, 129) through a wired connection (130) such as, for example, an Ethernet connection (standardized as IEEE 802.3) or a fiber optic connection (standardized as IEEE 802.8), among other standards.

Each access point (120) is communicatively coupled to the network and can relay data between a computing device (e.g., 126, 127, 128, 129) and the other devices on the network such as, for example, the server (145). The access points (120-1, 120-2, 120-3, 120-4) are managed and supported by a number of controllers (105, 110, 115).

As noted above, the controllers (105, 110, 115) configure and manage RF power, communication channels, authentication, and security used within the wireless communication network (100). In the present specification, the number of controllers (105, 110, 115) form a team. Among the members of the team, one controller is designated as the master controller (105) and the other controllers are designated as slave controllers (110, 115). Each controller (105, 110, 115) includes a processor (e.g., 107) used to perform at least the function of creating and propagating configurations of a number of access points as will be discussed in more detail below. Each controller (105, 110, 115) will also include a network connection for exchanging data with other controllers or other devices on the network or a connected network, such as, server (145) on network (140).

Although three controllers (105, 110, 115) are depicted in FIG. 1, any number of controllers may be included within the wireless communication network (100). Only one controller in the team is designated as the master controller. The controllers in the network may be divided into multiple teams, each team having its own master controller. Further, any number of access points (120-1, 120-2, 120-3, 120-4) may be communicatively coupled to each controller (105, 110, 115). For example, as depicted in FIG. 1, slave controller n (115) has two access points (120-3, 120-4) communicatively coupled thereto. While, as further depicted in FIG. 1, slave controller 1 (110) has one access point (120-2) communicatively coupled thereto. The master controller (105) has one access point (120-1) communicatively coupled thereto. However, again, any number of access points (120-1, 120-2, 120-3, 120-4) may be communicatively coupled to each controller (105, 110, 115).

The controllers (105, 110, 115) each comprise a data storage device (106, 111, 116) for storing configuration data as will be discussed in more detail below. In the present example, for the purposes of simplicity in illustration, the data storage devices (106, 111, 116) are separate computing devices communicatively coupled to a respective controller. However, the principles set forth in the present specification extend equally to any alternative configuration in which a controller (105, 110, 115) and a data storage device (106, 111, 116) are implemented in the same computing device.

The data storage devices (106, 111, 116) may be various types of memory modules, including volatile and nonvolatile memory that store the configuration data relating to the access points. For example, the data storage devices (106, 111, 116) of the present example may include, but are not limited to, Random Access Memory (RAM), Read Only Memory (ROM), Hard Disk Drive (HDD) memory, and combinations of these. Many other types of memory are available, and the present specification contemplates the use of many varying type(s) of memory in the data storage devices (106, 111, 116) as may suit a particular application of the principles described herein. In certain examples, different types of memory in the data storage devices (106, 111, 116) may be used for different data storage needs.

Generally, data storage devices (106, 111, 116) may comprise a computer readable storage medium. For example, the data storage devices (106, 111, 116) may be, but are not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device such as, for example, a processor. In one example, the data storage devices (106, 111, 116) are non-transitory data storage medium. The term computer readable storage medium does not include transmission media, such as an electronic signal per se.

The wireless computing devices (126, 127, 128, 129) may be any computing device that is capable of exchanging wireless data communications with the wireless communication network (100), and particularly, the access points (120-1, 120-2, 120-3, 120-4). For example, the wireless computing devices may be, but are not limited to, a desktop computer (126, 129), a laptop or tablet computer (127), or a mobile phone (128).

The wired portion of the network (140) may be any network, including, for example, a local area network (LAN), a wide are network (WAN), a virtual private network (VPN), and the Internet, among others. The network (140) provides the wireless computing devices (126, 127, 128, 129) with access to the server (145) and any other network (140) resources. In one example, the server (145) is a web server and the network (140) represents the Internet. In such an example, the computing devices (126, 127, 128, 129) request data from the server (145) over the network (140) using the appropriate network protocol (for example, Internet Protocol ("IP")).

Figure 2:
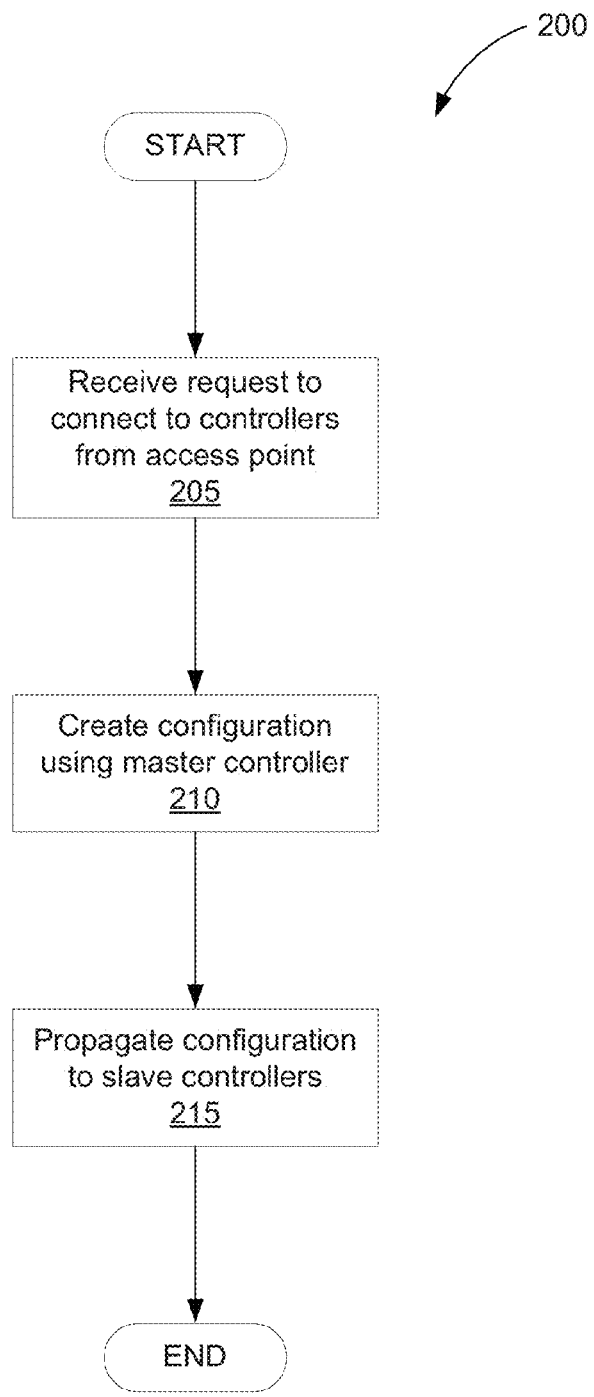
FIG. 2 is a flowchart showing an illustrative access point configuration propagation method using a master controller and a number of slave controllers, according to one example of the principles described herein.

FIG. 2 is a flowchart showing an illustrative access point configuration propagation method using a master controller (105, FIG. 1) and a number of slave controllers (e.g., 110, FIG. 1) according to one example of the principles described herein. The method of access point configuration propagation (200) begins with receiving (block 205) a request from a number of access points at any controller within the team of controllers to connect to the network (100, FIG. 1). After receiving (block 205) the request from the access points to connect to the network (100), the master controller creates (block 210) a configuration for the access points. After the master controller creates (block 210) a configuration for the access points, the master controller then propagates (block 215) the access point configuration to all the slave controllers within the network (100).

In one example, the protocol used in the communication from the master controller (105, FIG. 1) to the slave controllers (110, 115, FIG. 1) in propagating (block 215) the access point configuration to all the slave controllers is simple object access protocol (SOAP). This protocol will be discussed in more detail below in connection with FIG. 3.

Figure 3:
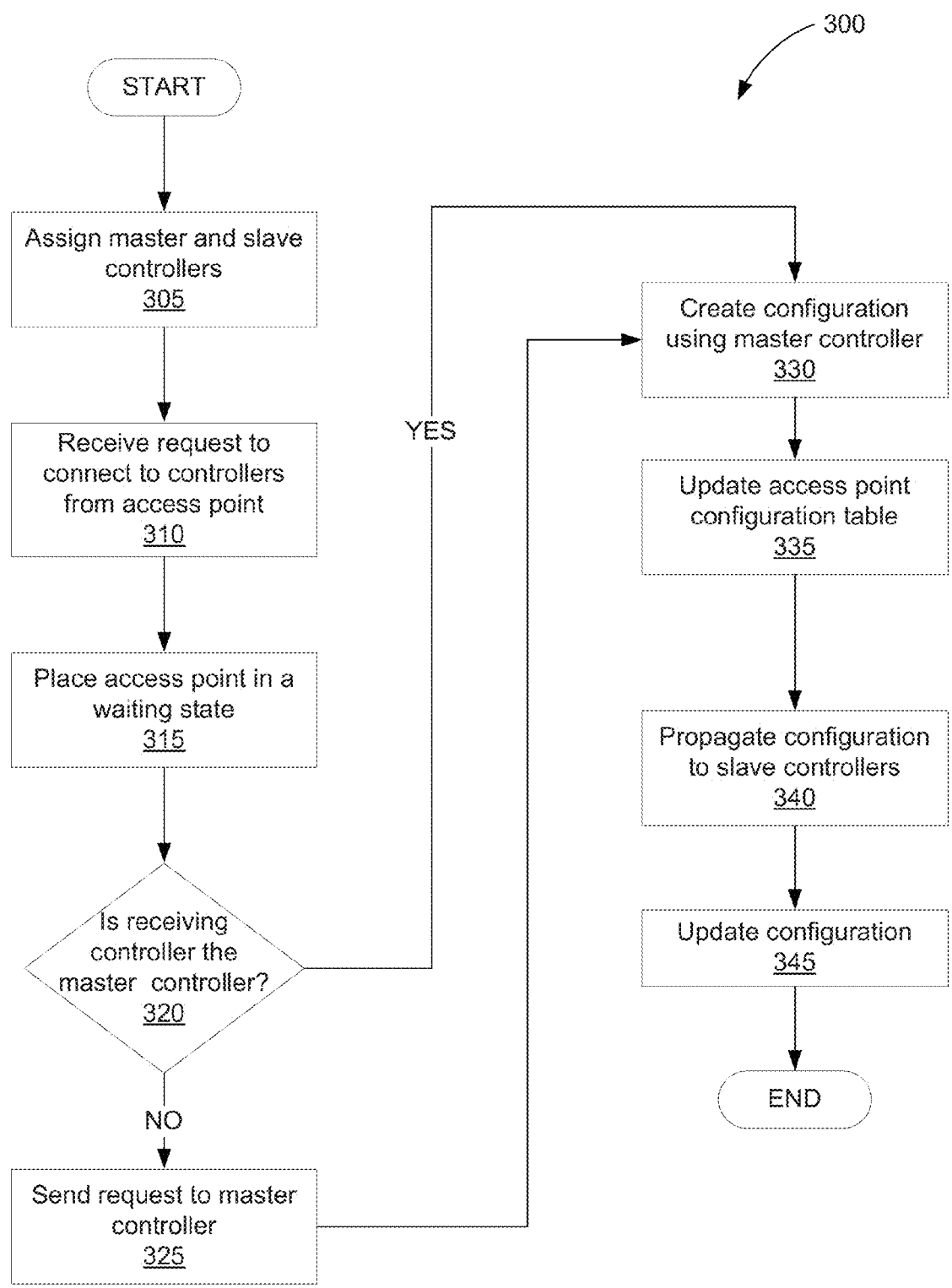
FIG. 3 is a flowchart showing an illustrative access point configuration propagation method using a master controller and a number of slave controllers, according to another example of the principles described herein.

FIG. 3 is a flowchart showing an illustrative access point configuration propagation method (300) using a master controller (105, FIG. 1) and a number of slave controllers (e.g., 110, 115 in FIG. 1). The method of access point configuration propagation (300) begins by designating (block 305) a master controller and a number of slave controllers from among the number of controllers available that form the controller team. The assignment of master and slave controllers may be performed by a user or administrator of the network (100, FIG. 1).

After the master/slave assignment (block 305), any controller in the team may receive (block 310) a request from a number of access points to connect to the network (100, FIG. 1). The request (block 310) from the access access points may be received individually from one or more of the access points or may be received from a collective group of access points. Further, the protocol used in the request for access from the access points may be any protocol including, for example, transmission control protocol (TCP), hypertext transfer protocol (HTTP), file transfer protocol (FTP), and internet control message protocol (ICMP), among others.

The access points requesting connection to the network (100, FIG. 1) may be placed in a waiting state (block 315). The network (100, FIG. 1) then determines (block 320) if the controller which received (block 310) the request from the access points is the master controller (105, FIG. 1) or one of the number of slave controllers (e.g., 110, 115 in FIG. 1). If the controller that received (block 310) the request from the access points is the master controller (block 320, determination YES), then the master controller creates (block 330) a configuration for the access points. If the controller that received (block 310) the request from the access points is not the master controller (block 320, determination NO), and is instead one of the slave controllers, then the request from the access points is sent (block 325) from that slave controller to the master controller. The protocol used in the communication from the slave controller to the master controller may be any protocol including, for example, transmission control protocol (TCP), hypertext transfer protocol (HTTP), file transfer protocol (FTP), and internet control message protocol (ICMP), among others.

In one example, during the creation (block 330) of the access point configuration, the master controller (105, FIG. 1) may create a "default" configuration in association with the access points (e.g., 120-1, 120-2, 120-3, 120-4 in FIG. 1) because there is no prior configuration for those access points. In this example, the master controller assigns a default configuration for those access points based on a default configuration file stored in the data storage device (106, FIG. 1) of the master controller (105, FIG. 1).

After, the default configuration is propagated to the slave controllers, an administrator or other user may then adjust the configuration for the associated access points and their supporting controllers (e.g., 105, 110, 115 in FIG. 1). In this example, the administrator will adjust the configuration for the associated access points at the master controller and re-propagate that new, non-default configuration throughout the slave controllers.

After creation of the access point configuration (block 330), the master controller updates (block 335) an access point configuration table stored within the data storage device of the master controller. The access point configuration table contains data regarding all of the access points within the network and with which controller those access points are associated. Thus, the master controller has an updated version of the access point configuration table that reflects all access points coupled to the network. Block 230 applies for all access points that are newly coupled to the network as well as those access points previously supported by a controller that has failed and are in need of a connection to a new controller.

After the master controller has created (block 330) a configuration for the access points and updated (block 335) the access point configuration table, the master controller then propagates (block 340) the access point configuration table to all the slave controllers within the network (100). The protocol used in the communication from the master controller (105) to the slave controllers may be simple object access protocol (SOAP). SOAP is a platform and language independent communication protocol specification utilized in the exchange of structured information in a decentralized, distributed environment. SOAP utilizes extensible markup language (XML) as a message format, and may rely on other application layer protocols, such as, for example, remote procedure call (RPC), simple mail transfer protocol (SMTP), and hypertext transfer protocol (HTTP), for message negotiation and transmission. SOAP consists of three parts: an envelope, which defines what is in the message and how to process it, a set of encoding rules for expressing instances of application-defined datatypes, and a convention for representing procedure calls and responses.

After the access point configuration table is sent to the slave controllers, the slave controllers update (block 345) their individual access point configuration tables and store these updated tables in their respective data storage devices. In this manner, if one of the controllers fails, that failed controller's associated access points can discover and connect with a different controller within the team of controllers, and resume a normal operating mode.

The methods described above can be accomplished by a computer program product comprising a computer readable storage medium having computer usable program code embodied therewith that, when executed, performs the above methods. In one example, the computer readable storage medium is a non-transitory computer readable storage medium.

Specifically, with reference to FIG. 1, the computer usable program code may assign, among a number of controllers (105, 110, 115), a master controller (105) and a number of slave controllers (110, 115). The computer usable program code may continue by receiving a request from a number of access points at any controller (105, 110, 115) within the team of controllers to connect to the network (100). The computer usable program code may then place the access points requesting connection to the network (100) in a waiting state.

The computer usable program code may then determine if the controller which received the request from the access points (120-1, 120-2, 120-3, 120-4) is the master controller (105) or one of the number of slave controllers (110, 115). If the controller which received the request from the access points (120-1, 120-2, 120-3, 120-4) is the master controller (105), then the computer usable program code may cause the master controller (105) to creates a configuration for the access points (120-1, 120-2, 120-3, 120-4). If the controller which received the request from the access points (120-1, 120-2, 120-3, 120-4) is not the master controller (105), and is instead one of the slave controllers (110, 115), then the computer usable program code may send the request from the access points (120-1, 120-2, 120-3, 120-4) from that slave controller (110, 115) to the master controller (105).

The computer usable program code may cause the master controller (105) to update an access point configuration table stored within the data storage device (106) of the master controller (105), and to propagate the access point configuration table to all the slave controllers (110, 115) within the network (100) via a simple object access protocol (SOAP). The computer usable program code may than cause the slave controllers (110, 115) to update their individual access point configuration tables and store these updated tables in their respective data storage devices (111, 116).

The specification and figures describe a system and method of propagating access point configuration data. As fully described above, the method comprises receiving at a controller, a connectivity request from a number of access points, with a master controller, creating a configuration for each of the access points, and sending configuration data based on the created configuration to a number of slave controllers. The processor propagates the access point configuration table to a number of slave controllers utilizing simple object access protocol (SOAP).

This system and method for access point configuration propagation may have a number of advantages, including: (1) providing a way to add an access point to a team of controllers in a way that is transparent to a user or administrator; (2) reducing or eliminating the occurrence of multiple controllers attempting to configure other controllers and access pints within the system, (3) providing a single master controller that creates and propagates the access point configuration rather than having each controller within the team of controllers create and propagate the access point configuration themselves individually, and (4) in the case of a controller within the team of controllers failing, access point discovery is possible with any remaining controller within the team.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of access point configuration propagation comprising:
    assigning a master controller and a number of slave controllers among a plurality of controllers;
    receiving, at a controller of the plurality of controllers, a connectivity request from a number of access points;
    with a master controller, creating a configuration for the access points; and
    with the master controller, sending configuration data based on the created configuration to a number of slave controllers,
    in which receiving the connectivity request comprises transmitting the connectivity request from a slave controller to the master controller to create a configuration for the access points.

2. The method of claim 1, further comprising providing network access to a computing device in communication with a said access point via a corresponding controller according to said configuration data.

3. The method of claim 1, further comprising:
    updating an access point configuration table stored in a master controller data storage device communicatively coupled to the master controller with the configuration data.

4. The method of claim 1, further comprising:
    updating an access point configuration table stored in a slave controller data storage device communicatively coupled to a slave controller with the configuration data.

5. The method of claim 4, in which updating an access point configuration table stored in a slave controller data storage device is performed for each slave controller within a wireless computing network.

6. The method of claim 1, in which sending configuration data based on the configuration to a number of slave controllers is performed using simple object access protocol (SOAP).

7. The method of claim 1, in which, upon failure of a controller, providing support to one or more access points that were supported by the controller that failed with a different controller using said configuration data.

8. The method of claim 1, in which receiving, at a controller of the plurality of controllers, a connectivity request from a number of access points comprises receiving a connectivity request from a number of access points at a first slave controller among the number of slave controllers.

9. The method of claim 1, in which receiving, at a controller of the plurality of controllers, a connectivity request from a number of access points comprises receiving a connectivity request from a number of access points at the master controller.

10. A master controller for propagating access point configurations within a controller team of a wireless network, comprising:
    a processor that creates a configuration for each of a number of access points requesting connectivity within the wireless network, the requests for connectivity from a number of slave controllers being transmitted to the master controller to create a configuration from the access points; and
    a data storage device that stores configuration data based on the created configuration in an access point configuration table;
    in which the processor further propagates the access point configuration data to a number of slave controllers.

11. The master controller of claim 10, in which the processor of the master controller utilizes simple object access protocol (SOAP) when propagating the access point configuration table to the slave controllers.

12. The master controller of claim 10, in which the processor creates a configuration for each of a number of access points requesting connectivity within the wireless network in response to a failure in one or more slave controllers previously communicatively coupled to those access points.

13. A computer program product comprising:
    a computer readable storage medium having computer usable program code for a processor of a master controller in a wireless network, such that, when executed, said code causes said master controller to receive an access point connectivity request from a slave controller;
    create an access point configuration; and
    propagate the access point configuration data to a group of slave controllers.

14. The computer program product of claim 13, further comprising:
    computer usable program code that, when executed by the processor, updates an access point configuration table stored in a master controller data storage device communicatively coupled to the master controller with the access point configuration data.

15. The computer program product of claim 13, further comprising:
    computer usable program code that, when executed by the processor, updates an access point configuration table stored in a slave controller data storage device communicatively coupled to a slave controller with said access point configuration data.

16. The computer program product of claim 13, further comprising computer usable program code that, when executed by the processor, upon failure of a controller, arranges support to one or more access points that were supported by the controller that failed with a different controller using the access point configuration data.

* * * * *